F. F. ELLIS.
GAME TRAP.
APPLICATION FILED OCT. 30, 1917.
1,349,717.
Patented Aug. 17, 1920.
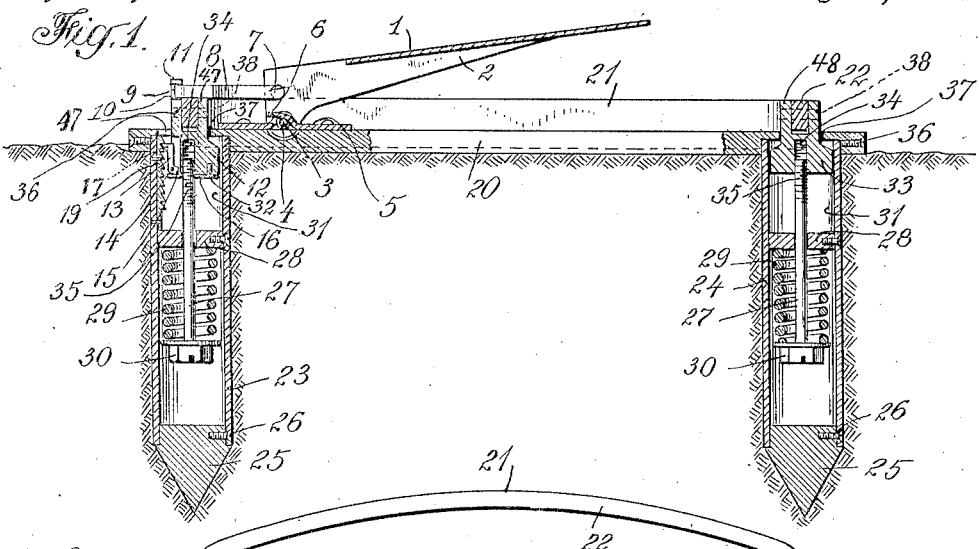
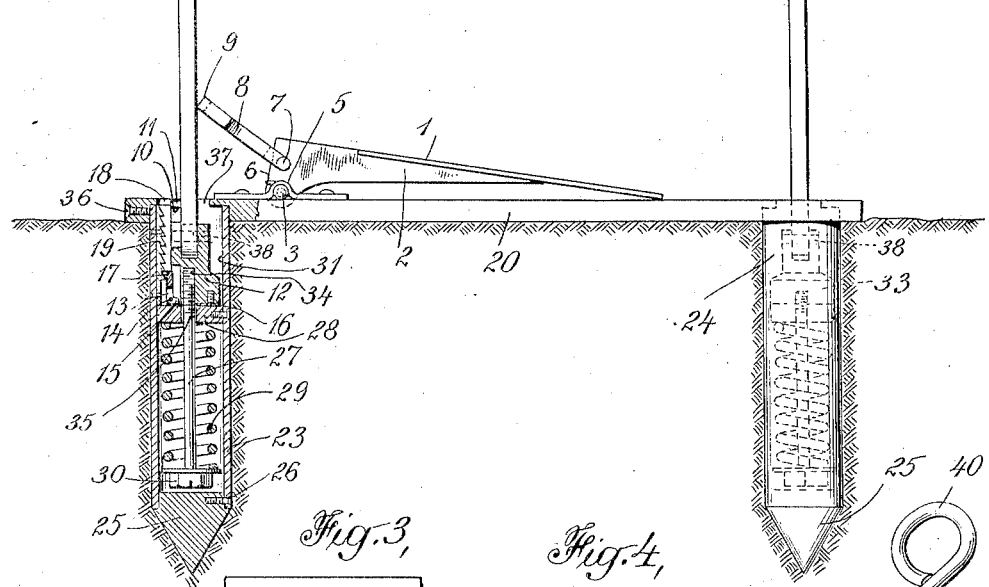
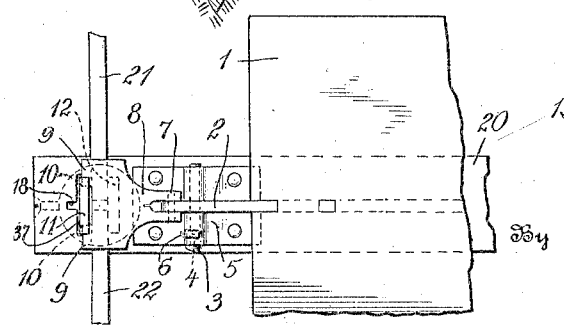
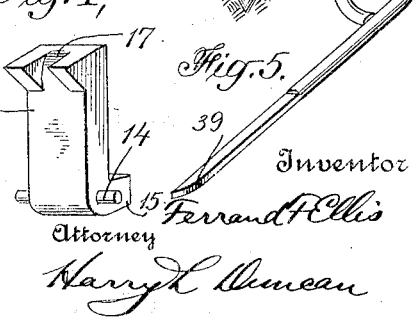
Inventor
Ferrand F. Ellis
Attorney
Harry L. Duncan

UNITED STATES PATENT OFFICE.

FERRAND F. ELLIS, OF ONEIDA, NEW YORK, ASSIGNOR TO ONEIDA COMMUNITY, LIMITED, OF ONEIDA, NEW YORK, A CORPORATION OF NEW YORK.

GAME-TRAP.

1,349,717.  Specification of Letters Patent.  Patented Aug. 17, 1920.

Application filed October 30, 1917. Serial No. 199,285.

*To all whom it may concern:*

Be it known that I, FERRAND F. ELLIS, a citizen of the United States, and resident of Oneida, Madison county, New York, have made a certain new and useful Invention Relating to Game-Traps, of which the following is a specification, taken in connection with the accompanying drawing, which forms part of the same.

This invention relates especially to spring actuated jaw traps in which the spring or springs of spiral or other form are protected and inclosed so as to preferably be largely or substantially buried in the ground when the trap is in operating position. For this purpose spiral compression springs may be mounted in tubular spring holders preferably having piercing points for convenient insertion in the ground. These spring holders may be rigidly connected with a frame bar and the jaws may be mounted on closing plungers or members projecting up from the spring holders when the trap is set and forcibly withdrawn into the holders by the springs when the jaws close. It is desirable to have the setting dog or detent pivotally or otherwise connected with the pan or its shank so as to be released by a substantially straight pull action and by mounting this detent near the jaw pivots, it is thrown upward by the jaws to a minimum extent so as to have little or no tendency to throw the animal's leg out of the trap.

In the accompanying drawing showing in a somewhat diagrammatic way an illustrative embodiment of the invention, Figure 1 is a vertical section taken through the spring casings and showing the trap in set position.

Fig. 2 is a similar partial sectional view showing the trap sprung or closed.

Fig. 3 is a partial top view; and

Figs. 4 and 5 are perspective views showing constructional details.

The trap frame may be of any suitable construction and may, for example, comprise the frame member or bar 20 which may be formed with holes, such as 37, to accommodate the ends of the jaws 21, 22. It is advantageous to protect or inclose the jaw springs and mount them in such manner that they are at least largely or substantially buried in the ground when the trap is in operating position and this may be conveniently effected by using inclosed spiral springs to operate the jaws. These jaw springs 29 may be of the compression type and may be mounted in tubular spring holders 23, 24 which are advantageously provided with more or less sharp piercing points 25 secured, if desired, to the holders as by the screws or pins 26, similar screws or pins 36 being indicated as releasably securing the holders to the frame bar 20. In this way the holders are firmly secured to the bar and may be readily forced into the ground so that they are not only concealed when the trap is in operating position but also capable of retaining it in this position to the extent desired, depending on the contour of the holders of the retaining devices which may be used in connection therewith to have more definite and strong engagement with the ground.

The jaws may be simply and securely mounted and operated by pivotally connecting them with suitable closing plungers or members having bodies, such as 12 or 33, loosely arranged with the chambers 31 at the upper ends of the spring holders and having pivot members or ears 47, 48 adapted to project through the apertures in the holders or connected frame member and to which the spring jaws may be pivoted as by the pivots or pins 38. In this way the setting of the trap by which procedure the jaws 21, 22 are opened raises the closing plungers against the resilient resistance of the springs which tend to draw the plungers and pivotal portions of the jaws within the holders as indicated in Fig. 2, and thus quickly and forcibly close the jaws. For this purpose each of the springs 29 may operate between a suitable stop or abutment 28 within the tubular holder and a head 30 on the spring bolt 27 or a suitable interposed washer, such as indicated. The threaded upper end 35 of this spring bolt may engage a threaded hole 34 in the closing plunger so that these parts are rendered adjustable and the turning of the bolt as by its polygonal head or the slot formed therein adjusts the tension of the spring.

The trap pan 1 may be secured in any suitable way to the pan shank 2 which is preferably removably pivoted to the frame bar 20. For this purpose the pivot 3 may extend through a pivot aperture formed in the clip 5 riveted or otherwise secured to the frame bar so as to securely hold the pan and shank in proper operating position. It is quite desirable for shipping purposes to have the pan and shank removable and this may be conveniently arranged by releasably holding the pivot in position as by having a resilient or other holding tongue 6 adapted to engage a reduced portion of the pivot 3 so that when it is sprung down into the holding position shown in Figs. 1 and 2 the pivot is securely held in position while the forcing upward of this light projecting tongue makes it possible to withdraw the pin and turn the pan into the same plane as the jaws and holders, much reducing the bulk of the trap during shipment. The setting dog or detent 8 may be suitably connected with the pan or shank in any desired way as by the pivot 7 formed integral with or riveted to the detent, for example, and engaging a pivot aperture in the shank and one or more ends 9 of this setting dog may engage a catch arranged in any suitable way so as to hold the jaws in the desired open position as shown in Fig. 3 until released by the withdrawal of this detent. A convenient way for effecting this is to provide a catch extension 11 on the pivot ear 47, for instance, and to form therein one or more suitable recesses or slots 10 with which the coöperating portions 9 of the detent may engage so as to be thus held in engagement with one or both of the trap jaws and releasably retain them in open position. As indicated in Fig. 3 the catch may be formed with two separated slots 10 on either side of the same with which the separated detent ends 9 may engage adjacent the pivotal points of the two jaws 21, 22. Both jaws may thus be held in substantially flat open position, although this is not necessary in all cases. By this arrangement and also by the loose or pivotal connection of the detent with the pan or its shank, a substantially straight pull detent may be provided which is furthermore not undesirably or forcibly thrown upward as the jaws close so that the tendency to throw the animal's leg out of the trap is thus minimized. It is desirable to have the depending tubular or other spring holders substantially water tight at least at their lower portions so as to minimize entrance of water under service conditions and this may of course be accomplished by forming their lower portions integral or with close fitting or filled joints in any suitable way. It is also desirable to have the substantially water tight spring holders extend somewhat above the ground level as by having them extend up into the frame bar 20. The joints between the projecting portions of the closing plungers and the apertures 37 through which they project may for similar reasons be made quite close or access of water be largely or substantially prevented at these points by filling or covering them with grease or other impervious material after the trap is set which is advantageous under some conditions, although not in all cases necessary. For some purposes it is desirable to positively lock the jaws in closed position after the trap has been sprung and a concealed or protected locking device for this purpose may comprise the locking ratchet bar or device 19 mounted within one of the holders, for example, in position to be engaged by the locking pawl or member 13 pivoted as by the pin 14 to the plunger 12. A suitable spring or member 16 may be secured by pins or screws 32 on the lower end of this plunger so as to engage the projecting tail 15 of the pawl and resiliently force it toward the ratchet bar locking device as is evident in Figs. 1 and 4. Thus when the trap is sprung the pawl allows the free downward movement of the plunger past the teeth of the ratchet but positively prevents upward movement through these interlocking parts. This is of course highly desirable in a burglar trap and also tends to prevent unauthorized persons from springing game traps. The locking device may, however, be released by a suitable releasing key or device shown in Fig. 5 as comprising a handle 40 and a reduced wedging end 39 which may be inserted through the aperture 18 so as to engage the releasing notch 17 in the pawl and wedge it backward away from the ratchet, thus allowing the trap to be opened.

This invention has been described in connection with a number of illustrative embodiments, forms, materials, parts, arrangements and methods of manufacture and use, to the details of which disclosure the invention is not of course to be limited, since what is claimed as new and what is desired to be secured by Letters Patent is set forth in the appended claims.

1. In game traps, a frame member, a pair of depending tubular substantially water-tight spring holders having their upper ends projecting within and secured to said frame member and having piercing points to facilitate insertion in the ground, compression spiral springs mounted within said holders and operating against stops therein, spring bolts on which said springs act, closing plungers mounted within the upper ends of said holders and adjustably connected to said spring bolts and having reduced pivot ears projecting through closely fitting apertures in said frame member, trap jaws pivoted to said ears and extending above said frame member, a pan and connected pan shank pivoted to said frame member, a setting detent connected to said pan and a setting catch formed on one of said pivot ears to hold said trap jaws in open position when said detent engages said catch.

2. In game traps, a frame member, a pair of depending tubular spring holders having their upper ends projecting within and secured to said frame member and having piercing points to facilitate insertion in the ground, compression spiral springs mounted within said holders, spring bolts on which said springs act, closing plungers mounted within the upper ends of said holders and connected to said spring bolts and having reduced pivot ears projecting through apertures in said frame member, trap jaws pivoted to said ears and extending above said frame member, a pan and connected pan shank pivoted to said frame member, a setting detent connected to said pan and a setting catch formed on one of said pivot ears to hold said trap jaws in open position when said detent engages said catch.

3. In game traps, a frame member, a pair of depending tubular spring holders having their upper ends projecting within and secured to said frame member and having piercing points to facilitate insertion in the ground, compression spiral springs mounted within said holders, spring bolts on which said springs act, closing plungers mounted within the upper ends of said holders and connected to said spring bolts and having reduced pivot ears projecting through apertures in said frame member, trap jaws pivoted to said ears and extending above said frame member, a pan and connected setting detent, and a setting catch to hold said trap jaws in open position when said detent engages said catch.

4. In game traps, a frame member, a pair of depending spring holders having their upper ends secured to said frame member, compression spiral springs mounted within said holders, spring closing plungers mounted within the upper ends of said holders and connected to said springs and having reduced pivot ears projecting through apertures in said frame member, trap jaws pivoted to said ears and extending above said frame member, a pan pivoted to said frame member, a setting detent connected to said pan and a setting catch formed on one of said pivot ears to hold said trap jaws in open position when said detent engages said catch.

5. In game traps, a narrow frame member, a pair of depending spring holders having their upper ends secured to said frame member, spiral springs mounted within said holders, spring closing plungers mounted within the upper ends of said holders and connected to said springs and having reduced pivot ears projecting through apertures in said frame member, trap jaws pivoted to said ears and extending above said frame member, a pan pivoted to said frame member, and normally extending transversely to the plane of said spring holders, means to permit the disengagement of said pan from said frame member for compact shipping, a setting detent connected to said pan and a setting catch to hold said trap jaws in open position when said detent engages said catch.

6. In game traps, a frame member, a compression spiral jaw spring, a depending tubular spring holder connected to said frame member and inclosing and protecting said jaw spring and adapted to be partially buried in the ground under operating conditions, trap jaws loosely mounted on said frame member, a closing member within said holder and connected to said spring, a projecting pivot ear on said closing member to which said jaws are pivoted, a catch on said closing member and a setting detent coöperating with said catch and adapted to be withdrawn therefrom to spring the trap.

7. In game traps, a frame member, a spiral jaw spring, a depending tubular spring holder connected to said frame member and inclosing and protecting said jaw spring and adapted to be partially buried in the ground under operating conditions, trap jaws loosely mounted on said frame member, a closing member within said holder and connected to said spring and to which said jaws are pivoted, a catch on said closing member and a setting detent coöperating with said catch and adapted to be withdrawn therefrom to spring the trap.

8. In game traps, a frame member, a jaw spring, a depending spring holder connected to said frame member and inclosing and protecting said jaw spring and adapted to be at least partially buried in the ground under operating conditions, trap jaws loosely mounted on said frame member, a closing member within said holder and connected to said spring to which said jaws are pivoted, a catch and a setting detent coöperating with said catch and adapted to be withdrawn therefrom to spring the trap.

9. In game traps, a frame member, a jaw spring, a depending spring holder connected to said frame member and inclosing and protecting said jaw spring under operating conditions, a trap jaw loosely mounted on said frame member, a closing member within said holder and connected to said spring to which said jaw is connected, a catch on said closing member and a setting detent coöperating with said catch and adapted to be withdrawn therefrom to spring the trap.

10. In game traps, a frame member, a jaw spring, a spring holder connected to said frame member and inclosing and protecting said jaw spring under operating conditions, a trap jaw loosely mounted on said frame member, a closing member connected to said spring to which said jaw is connected, a catch and a setting detent coöperating with said catch and adapted to be withdrawn therefrom to spring the trap.

11. In traps, a frame member, a depending spring holder secured to said frame member, a compression spiral spring mounted within said holder, a closing plunger and trap jaws connected to said spring and extending above said frame member, a setting detent to hold said trap jaws in open position, a ratchet bar locking device within said holder, a spring pressed locking pawl mounted on said closing plunger and coöperating with said locking device to positively prevent the releasing opening movement of said jaws after the trap is sprung and a hole in said frame member for the insertion of a releasing device to engage said locking pawl and withdraw it from contact with said locking device.

12. In traps, a frame member, a spring holder secured to said frame member, a spring mounted within said holder, trap jaws connected to said spring and extending above said frame member, a setting detent to hold said trap jaws in open position, a ratchet bar locking device within said holder, a spring pressed locking pawl coöperating with said locking device to positively prevent the releasing opening movement of said jaws after the trap is sprung and adapted to be manually withdrawn from contact with said locking device.

13. In traps, a frame member, a spring holder secured to said frame member, a spring mounted within said holder, trap jaws connected to said spring and extending above said frame member, a setting detent to hold said trap jaws in open position, a locking device within said holder, a spring pressed locking member coöperating with said locking device to positively prevent the releasing opening movement of said jaws after the trap is sprung and adapted to be manually withdrawn from contact with said locking device.

14. In game traps, a frame member, a jaw spring and connected trap jaws extending above said frame member, a pan and connected pan shank removably pivoted to said frame member, a setting detent pivotally connected to said pan and having a plurality of separated projecting ends and a coöperating setting catch having lateral slots adjacent the pivotal portions of the two trap jaws to hold said trap jaws in substantially flat open position when said detent engages said catch.

15. In game traps, a frame member, a jaw spring and connected trap jaws extending above said frame member, a pan pivoted to said frame member, a setting detent pivotally connected to said pan and having a plurality of separated projecting ends and a coöperating setting catch having lateral slots adjacent the pivotal portions of one of said trap jaws to hold said trap jaws in open position when said detent engages said catch.

FERRAND F. ELLIS.

Witnesses:
 SIDNEY C. PHELPS,
 MERTON W. LINDSLEY.